United States Patent
Blaney

[11] Patent Number: 6,158,805
[45] Date of Patent: Dec. 12, 2000

[54] RETRACTABLE GOLF CART SEAT COVER

[76] Inventor: Bruce A. Blaney, 114 Main St., Littleton, N.H. 03561

[21] Appl. No.: 09/035,121

[22] Filed: Mar. 5, 1998

[51] Int. Cl.⁷ ................................................... A47C 31/11
[52] U.S. Cl. ................................... 297/184.11; 135/88.09
[58] Field of Search ........................... 297/184.1, 184.11, 297/229; 135/88.09; 160/23.1, 24

[56] References Cited

U.S. PATENT DOCUMENTS

| | | | |
|---|---|---|---|
| 1,885,510 | 11/1932 | Chapman | 160/23.1 |
| 3,146,824 | 9/1964 | Veilleux | 160/23.1 |
| 3,563,594 | 2/1971 | London | 160/23.1 X |
| 4,118,066 | 10/1978 | Ricke | 297/184.11 |
| 4,320,922 | 3/1982 | Meritis | 297/229 X |
| 4,790,592 | 12/1988 | Busso et al. | 297/184.11 |
| 4,828,319 | 5/1989 | Benson | 160/23.1 X |
| 5,330,251 | 7/1994 | McGuire | 297/184.11 X |
| 5,775,765 | 7/1998 | Kintz | 160/23.1 X |

*Primary Examiner*—Peter R. Brown
*Attorney, Agent, or Firm*—Alvin S. Blum

[57] ABSTRACT

Apparatus for more conveniently covering and uncovering the individual seats of a two-seat motorized golf cart includes an elongate housing mounted above the seat backs. A pair of rollers are rotatably mounted within the housing by torsion springs. Each roller has a water and weather resistant rectangular sheet wound on it with a rigid bar at the free end. To cover a seat and seat back, the bar is pulled out from the front face slot of the housing and attached to a fastener below the front of the seat. The sheet then covers the seat and seat back in a sloping orientation because the springs maintain constant tension. The sloping orientation enables the cover to shed dirt, debris, water and snow more effectively. When the bar is unfastened, the cover is automatically retracted into the housing.

9 Claims, 2 Drawing Sheets

RETRACTABLE GOLF CART SEAT COVER

BACKGROUND OF THE INVENTION

This invention relates to seat covers, and, more particularly, to retractable seat covers for covering the seats of golf carts when unoccupied.

A golf course will ordinarily have so many motorized golf carts that they cannot afford sheltered storage space for them all. Consequently, they are left exposed to the weather. The sun damages the surfaces. Snow, rain, dust and dirt are deposited on the surfaces as well. Various covers may be thrown over the carts or the seats of the carts to protect them from the elements. Wind may displace the covers, exposing the surfaces to the elements. When a golfer leaves the cart to play a hole in the rain, the seat will be wet when he returns. It is awkward to either cover or dry the seat each time the player leaves the cart.

It is a very labor intensive task for the course personel to keep the cart seats clean and dry.

SUMMARY OF THE INVENTION

It is accordingly, an object of the invention to provide means for covering the seats of a golf cart that will protect the seats from the elements that is rapidly applied and removed with minimal effort. It is another object that the cover be applicable to each of the seats individually so that a single user can keep the unoccupied seat covered. It is another object that the cover protect the seat from the elements and not be easily displaced by wind. It is yet another object that the cover be easily retrofitted on existing carts.

The retractable seat covers of the invention comprises a housing mounted above the seat backs and extending across the top of both seat backs. Contained within the housing are two elongate, rollers that are spring wound. Each roller has a rectangular web of water and weather proof material wound thereon. The free end of each web terminates in an elongate bar or rod. Each spring-loaded roller acts as a reel, releasing the web as it is pulled out and winding it back in when released.

A fastening means below the front of each seat engages the bar when the web is extended thereby covering the seat back and bottom surfaces. In the extended position the web is under tension from the spring. To uncover the seat, the bar is released and the web is automatically rolled up within the housing. To cover the seat, the rod is pulled out and attached to the fastening means.

These and other objects, advantages and features of the invention will become more apparent when the detailed description is considered in conjunction with the drawings.

DETAILED DESCRIPTION OF PREFERRED EMBODIMENTS

Figure 1:
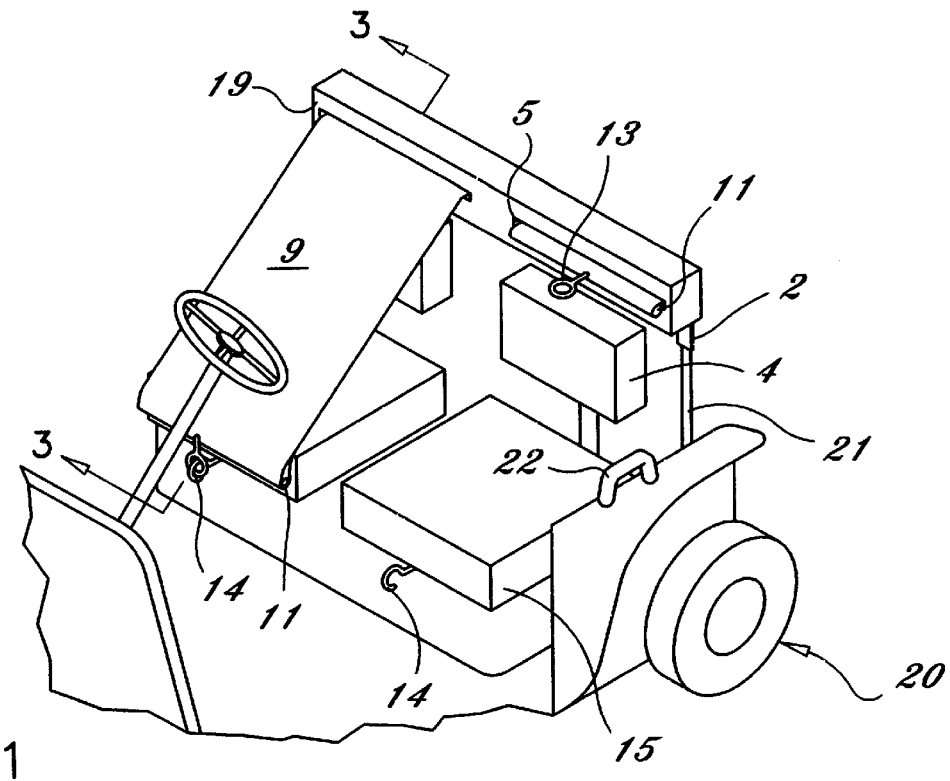
FIG. 1 is a perspective view of a golf cart with the invention installed thereon.
Figure 2:
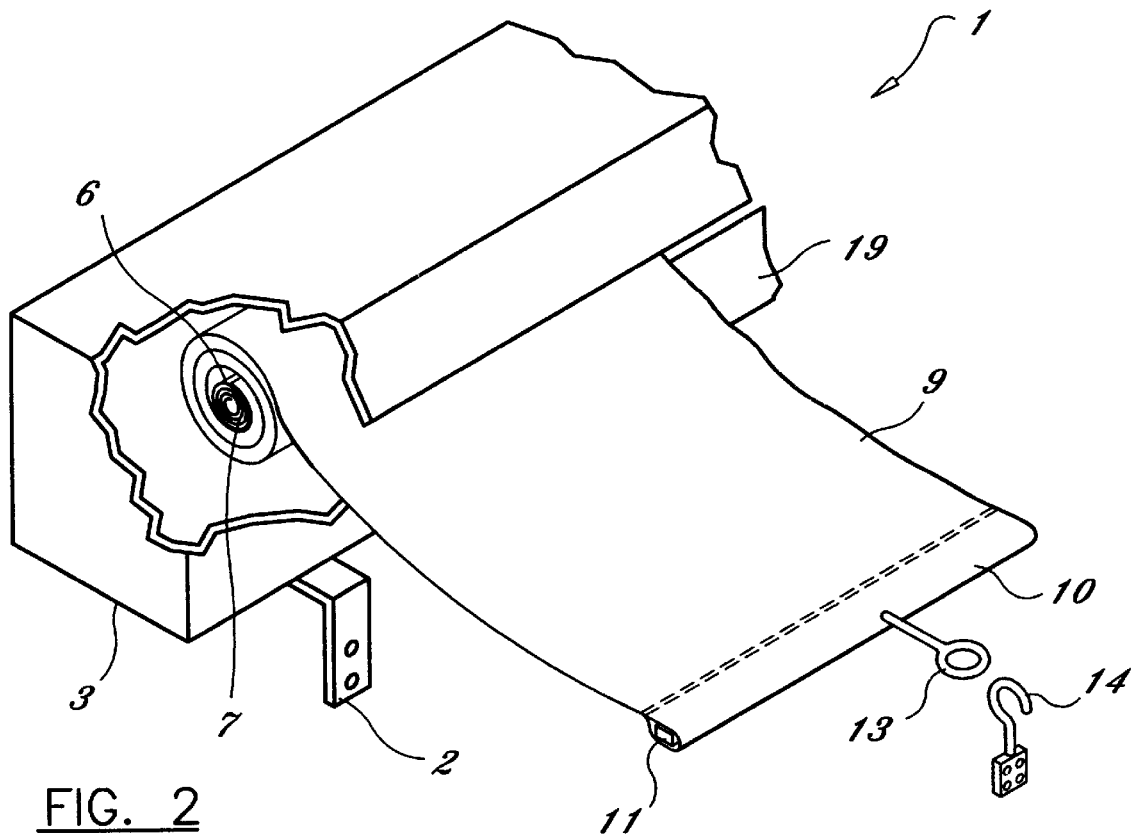
FIG. 2 is a perspective view of a portion of the invention, partially broken away.
Figure 3:
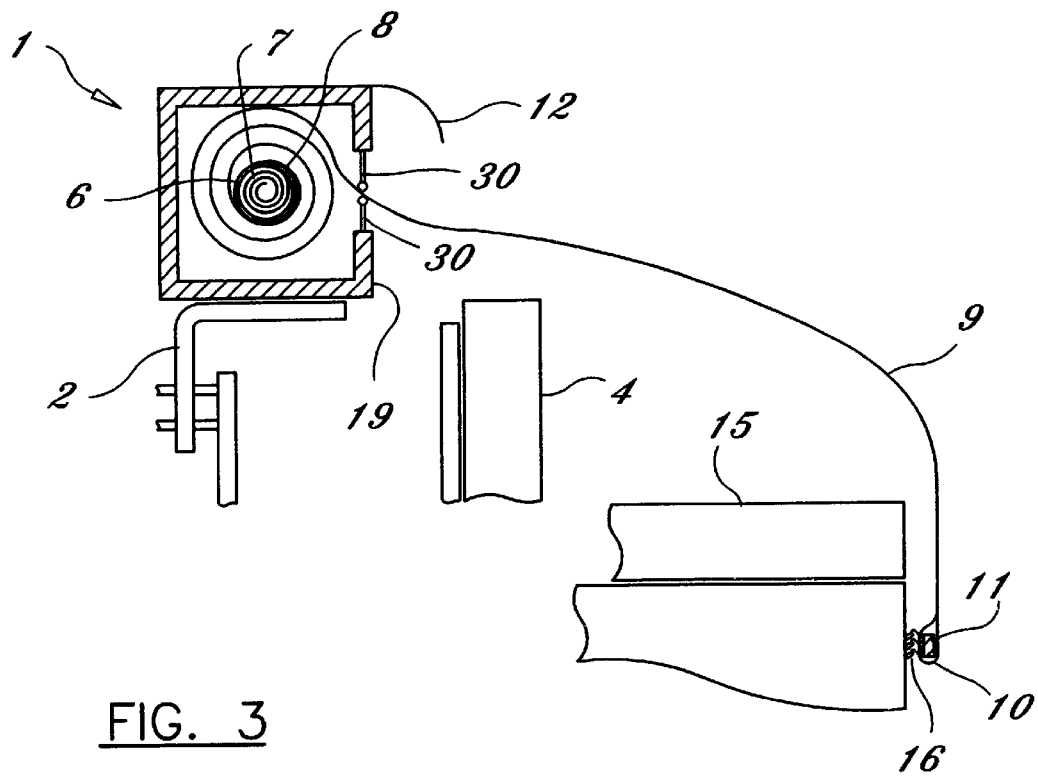
FIG. 3 is a cross sectional view taken on line 3—3 of FIG. 1.

Referring now first to FIGS. 1–3, a two-seat motorized golf cart 20, of the type well known in the art, has the retractable seat cover apparatus 1 of the invention mounted thereto by mounting bracket 2 bolted either to the cart structure 21 or the seat back 4, as desired. Bolted to the brackets 2 is the long narrow housing 3. In the front face 19 of the housing is a long slot-like opening 5. Two rollers 6 are rotatably mounted side by side within the housing by torsion springs 7 which may be mounted on each end of each roller for redundancy and uniformity of rolling force. Each roller is provided with a water and weather resistant rectangular web 9 or sheet such as a plastic coated nylon fabric. A first end 8 of the web is affixed to the roller. A second, or free end 10 of the web is provided with a rigid elongate bar or rod 11. When the bar 11 is free, the spring 7 causes the roller to wind the web up on the roller until the bar 11 contacts the front face 19 of the housing 3, thereby closing off the opening 5. An overhanging hood 12 may optionally be provided to further protect the opening.

A ring 13 is attached to the bar 11. When the ring is pulled, the web unwinds from the roller under continuous tension of the spring. The ring 13 is hung on the hook 14, which is attached below the front of the seat 15. The web then covers the seat back 4 and the seat 15. The spring tension holds the web in a sloping orientation so that dirt, water, snow and debris will be shed by gravity when the cover is thus deployed. The web has a width at least as great as the seat, and the apparatus fixedly positions the deployed web laterally so that it reproducibly covers the seat and back without adjustment, as shown in FIG. 1.

To retract the cover, the bar is simply unhooked and the cover retracts through the opening. Alternative well known means for attaching the bar below the seat may optionally be employed, such as, for example, the hook-and-loop fastening means 16 as shown in FIG. 3.

Figure 4:
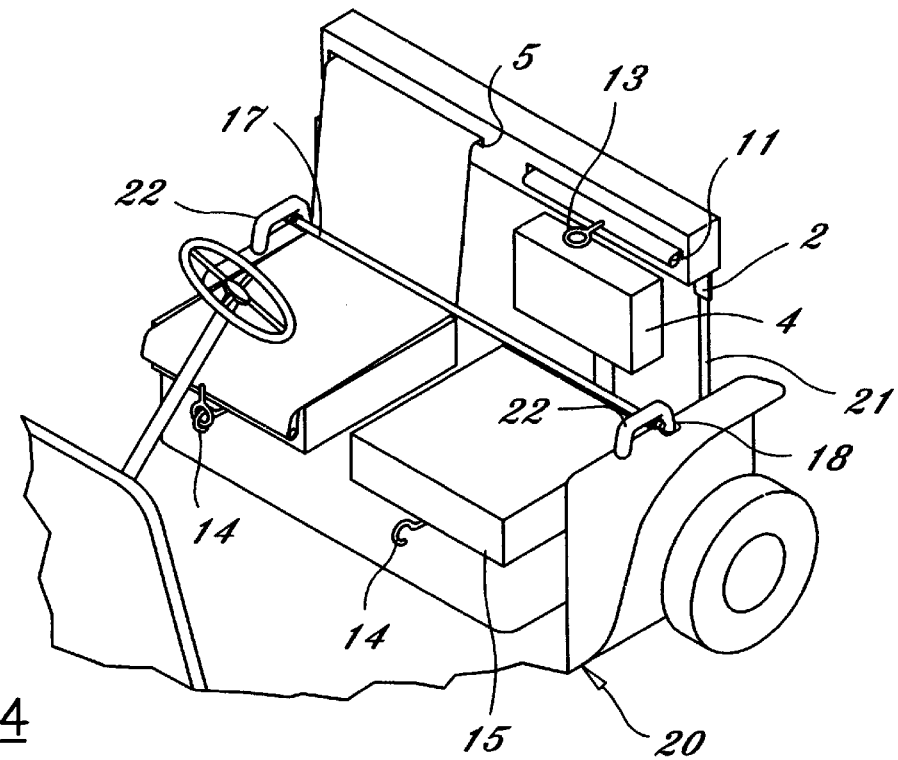
FIG. 4 is a perspective view as in FIG. 1 with an optional elastic cord holding the cover close to the seat.

If it is desired to have the cover 9 lie closer to the seat and seat back surfaces, an elastic cord 17 with cord hooks 18 at either end may be employed as shown in FIG. 4, hooked to the arm rests.

As shown in FIG. 3, the opening may optionally be provided with a pair of squeegees or wipers 30 to close off the opening at top and bottom, and to wipe off the web.

A housing may optionally be positioned with the opening facing to the rear of the cart to be used to cover clubs and other gear, as desired.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

What is claimed is:

1. Apparatus which retractably and protectively covers two seats and seat backs of a golf cart, the golf cart having a first seat and a second seat and a first seat back and a second seat back, the apparatus for covering comprising:

(A) an elongate housing having at least one long opening;

(B) mounting means for mounting said housing above the seat backs of the golf cart, with the opening facing forward;

(C) two elongate rollers, each roller rotatably mounted within said housing;

(D) each roller provided with a water and weather resistant, substantially rectangular, web, having a width at least as great as the width of one seat, said web having a pair of opposed broad faces and a pair of opposed ends, the first of said ends permanently attached to said roller and a second of said ends being attached to an elongate rod or bar at said opening;

(E) rod attaching means arranged for mounting below said one seat at the front thereof, said rod attaching means releasably engaging said rod when said rod is pulled from said housing and attached to said rod attaching means, thereby extending said web from said housing and over said seat and seat back for protective covering thereof; and (F) rotary spring bias means connecting said housing to said roller to cause said web to retract and roll up on said roller when said rod is released from said rod attaching means and to cause said web to assume a sloping orientation over said seat and seat back with fixed lateral positioning under continuous tension when deployed for enhanced shedding of soil and water for reproducibly covering said seat and seat back.

2. The apparatus of claim 1, in which said attaching means comprises one member of a hook-and-loop fastener assembly and the other member of the hook-and-loop fastener assembly is connected to said rod.

3. The apparatus of claim 1, in which said attaching means comprises one member of a hook and ring assembly, and the other member of said assembly is connected to said rod.

4. The apparatus of claim 1, in which said at least one long opening is protected by an overhanging hood attached to the housing.

5. The apparatus of claim 1, in which said at least one long opening is protectively covered by said rod when said rod is retracted.

6. The apparatus according to claim 1, in which said at least one opening is protectively guarded by wipers attached to the housing arranged to wipe said web as said web passes said at least one opening.

7. In a golf cart having a first seat and seat back and a second seat and seat back, apparatus for reproducibly covering and protecting each seat and seat back selectively the apparatus comprising:

(A) an elongate housing having at least one long opening;

(B) mounting means for mounting said housing above the seat backs of the golf cart, with the opening facing forward;

(C) two elongate rollers, each roller rotatably mounted within said housing;

(D) each roller provided with a water and weather resistant, substantially rectangular web, having a width at least as great as the width of one seat, said web having a pair of opposed broad faces and a pair of opposed ends, the first of said ends permanently attached to said roller and a second of said ends being attached to an elongate rod or bar at said opening;

(E) rod attaching means arranged for mounting below said one seat at the front thereof, said rod attaching means releasably engaging said rod when said rod is pulled from said housing and attached to said rod attaching means, thereby extending said web from said housing and over said stand seat back for protective covering thereof;

(F) rotary spring bias means connecting said housing to said roller to cause said web to retract and roll up on said roller when said rod is released from said rod attaching means and to cause said web to assume a sloping orientation over said seat and seat back with fixed lateral positioning under continuous tension when deployed for enhanced shedding of soil and water for reproducibly covering said seat and seat back; and (G) an overhanging hood attached to said housing for protecting said opening from the weather.

8. The apparatus according to claim 7, further comprising at least one wiper attached to said housing and arranged to wipe said web as said web passes said at least one opening.

9. In a golf cart having a first seat and seat back and a second seat and seat back, apparatus for reproducibly covering and protecting each seat and seat back selectively the apparatus comprising:

(A) an elongate housing having at least one long opening;

(B) mounting means for mounting said housing above the seat backs of the golf cart, with the opening facing forward;

(C) two elongate rollers, each roller rotatably mounted within said housing;

(D) each roller provided with a water and weather resistant, substantially rectangular web, having a width at least as great as the width of one seat, said web having a pair of opposed broad faces and a pair of opposed ends, the first of said ends permanently attached to said roller and a second of said ends being attached to an elongate rod or bar at said opening;

(E) rod attaching means arranged for mounting below said one seat at the front thereof, said rod attaching means releasably engaging said rod when said rod is pulled from said housing and attached to said rod attaching means, thereby extending said web from said housing and over said seat and seat back for protective covering thereof;

(F) rotary spring bias means connecting said housing to said roller to cause said web to retract and roll up on said roller when said rod is released from said rod attaching means and to cause said web to assume a sloping orientation over said seat and seat back with fixed lateral positioning under continuous tension when deployed for enhanced shedding of soil and water for reproducibly covering said seat and seat back;

(G) an overhanging hood attached to said housing for protecting said opening from the weather; and (H) at least one wiper attached to said housing and arranged to wipe said web as said web passes said at least one opening.

* * * * *